May 14, 1940.   P. SLOBODY   2,200,585
LIQUID DISPENSING DEVICE
Filed March 13, 1937   2 Sheets-Sheet 1
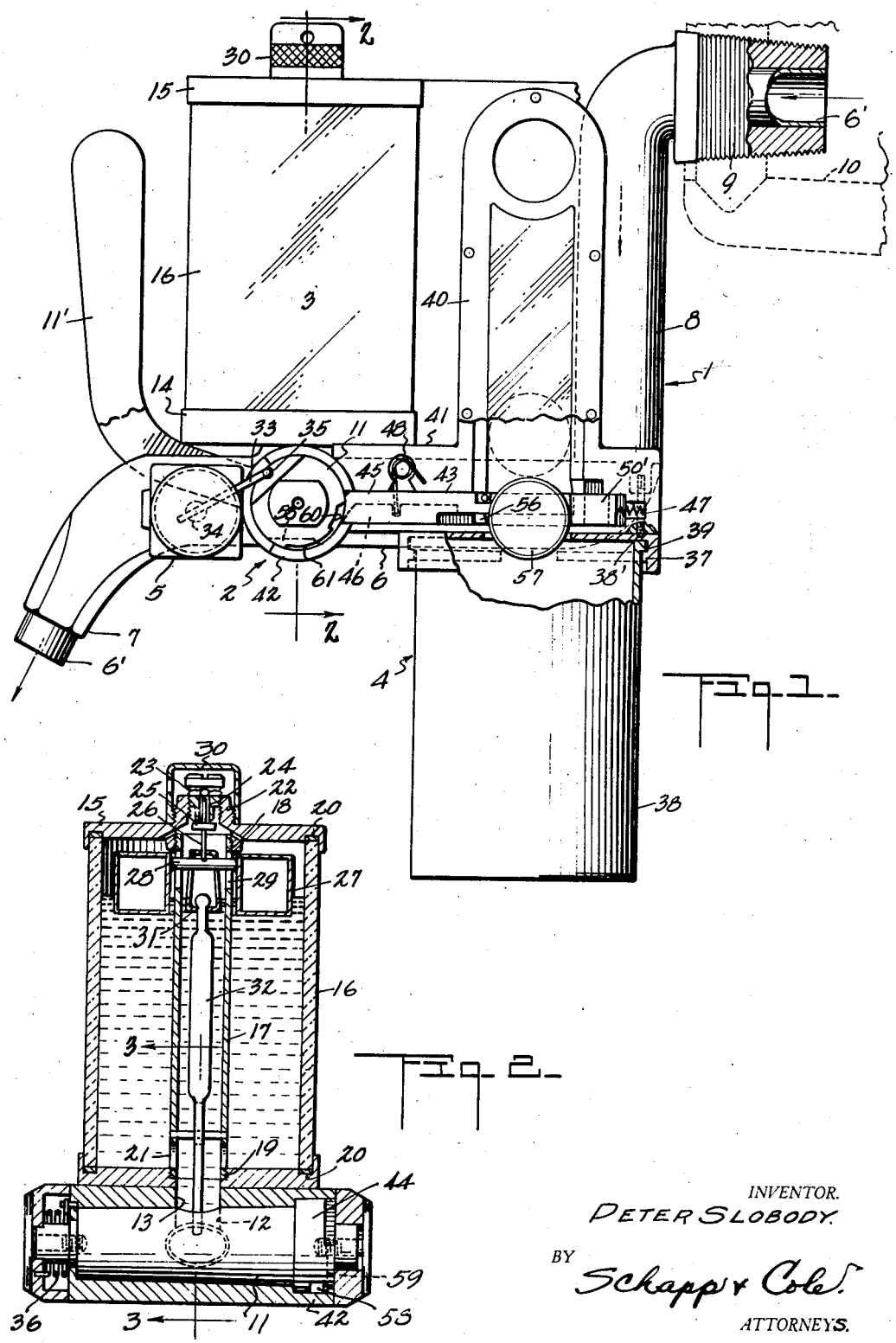
INVENTOR.
PETER SLOBODY.
BY Schapp & Cole
ATTORNEYS.

May 14, 1940.  P. SLOBODY  2,200,585
LIQUID DISPENSING DEVICE
Filed March 13, 1937  2 Sheets-Sheet 2
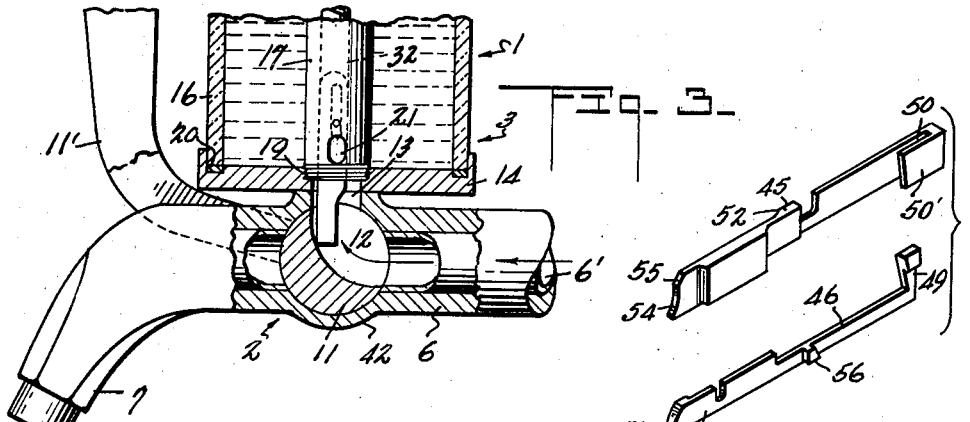
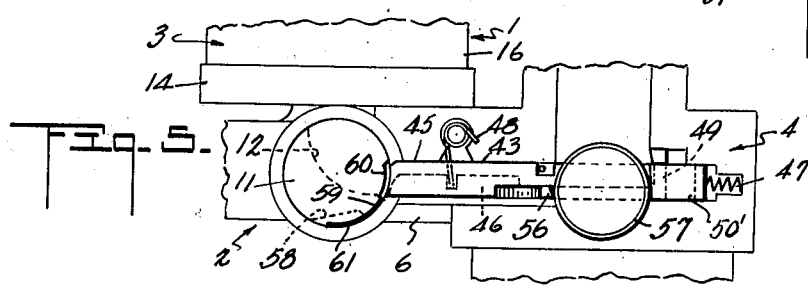
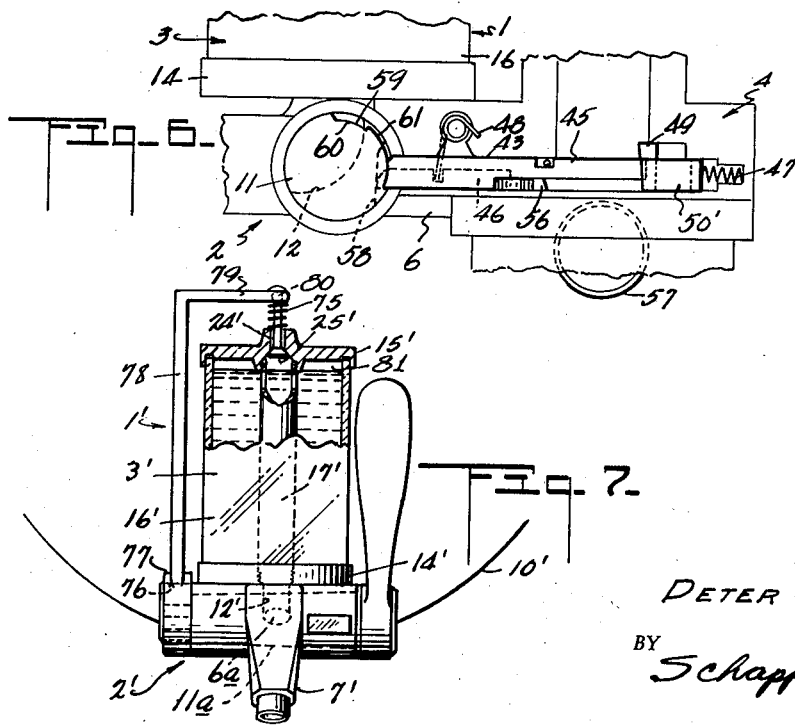
INVENTOR.
PETER SLOBODY.
BY Schapp & Cole
ATTORNEYS.

Patented May 14, 1940

2,200,585

UNITED STATES PATENT OFFICE 2,200,585

LIQUID DISPENSING DEVICE

Peter Slobody, San Francisco, Calif.

Application March 13, 1937, Serial No. 130,722

3 Claims. (Cl. 194—92)

The present invention relates to improvements in liquid dispensing devices and its principal object is to provide a device for dispensing liquor or other liquids in such a manner that the customer may help himself to secure a measured quantity of liquid upon insertion of a specified coin into the device.

In carrying out this general object it is particularly proposed to provide means for withdrawing liquid in measured quantities from a larger container, the said means being arranged to permit the customer to view the amount and color of the liquid before he inserts his coin for securing the drink.

It is further proposed to arrange the device in such a manner that the entire contents of a larger container may be withdrawn without requiring any tilting of the container.

It is further proposed to provide a metering chamber and a double-acting valve for filling and emptying the chamber, as well as suitable venting means for permitting filling and emptying of the metering chamber and dispensing of the liquid in uniform quantities.

A further object of the invention is to provide a coin-control for the device whereby a measured quantity of the liquid can only be obtained upon the insertion of a coin of a designated denomination.

It is a further object of the invention to combine with the coin-controlled dispensing device a counter whereby each quantity of liquor passing through the device is registered and the number of drinks dispensed can be ascertained at any time.

It is further proposed to provide certain improvements in the general arrangement of the combined features set forth to produce a unit that is attractive in appearance, rugged and economic in construction and easy and simple to operate.

Further objects and advantages of my invention will appear as the specification proceeds.

The preferred form of my invention is illustrated in the accompanying drawings in which:

Figure 1 shows a side elevation of my liquid dispensing device, with parts broken away to disclose the interior mechanism thereof, Figure 2 a section taken along line 2—2 of Figure 1, Figure 3 a fragmentary section taken along line 3—3 of Figure 2, Figure 4 a perspective view of a detent and its control member used in my device, Figure 5 a fragmentary detail view illustrating the coin control, Figure 6 a similar view with the parts in a different position, and Figure 7 a fragmentary showing of a modified form of the venting means, the view being a front elevation with parts broken away to show the interior thereof.

While I have shown only the preferred forms of my invention it should be understood that various changes or modifications may be made within the scope of the claims hereto attached without departing from the spirit of the invention.

In its preferred form my liquid dispensing device 1 comprises a faucet 2, a metering chamber 3, a coin control 4 and a counter 5.

The faucet 2 comprises a conduit 6 including a horizontal section terminating at its front end in a spout 7 and a vertical rear section 8 terminating in a threaded horizontal extension 9 adapted for attachment to a keg, barrel or other container 10 from which the liquid is dispensed. The conduit 6 is preferably lined with a tube 6' extending from one end thereof to the other, and made of suitable material so as to resist the reaction of liquor thereon.

The horizontal section of the conduit is provided with a transversely arranged rotary valve 11 which has a port 12 adapted to connect the container side of the conduit with a vertical port 13 in one position and to connect the port 13 with the spout end of the conduit when moved into another position. The valve is operated by means of a handle 11'.

The port 13 communicates with the interior of the metering chamber 3 superimposed on the valve and the latter chamber preferably comprises two flanged end plates 14 and 15 and a cylinder 16 of glass or similar transparent material interposed between the same. The plate 14 may be permanently fastened to the conduit while the plate 15 is clamped upon the cylinder by being threaded on a vertical tube 17, as at 18, the tube being threaded into the lower plate as at 19. Suitable washers 20 may be interposed between the cylinder and the plates.

The tube 17 has openings 21 through which liquid may freely communicate between the inside of the tube and the remainder of the metering chamber. The upper plate 15 has a neck 22 into which the plug 23 is threaded, the plug having a vent hole 24 through which air may enter or escape, unless the vent hole is closed by a valve 25 which latter is fastened to a stem 26, the lower end of which is supported by a float 27. The latter is preferably ring-shaped so as to encircle the tube 17 and is fastened to the stem by means of a cross-piece 28 extending through vertical slots 29 in the tube with limited freedom of vertical motion. A cap 30 covers the vent structure and renders unauthorized access to the same more difficult.

The cross-member 28 has a yoke 31 suspended therefrom and this yoke supports a weighted stem 32, the lower end of which extends into the port opening 12 of the valve 11 as shown particularly well in Figure 3. The lower extremity of this stem is offset relative to the vertical center-line of the valve and is arranged to drop through a short distance, when the valve is turned counter-clockwise, that is, from filling to emptying position and to be lifted on a reverse movement of the valve. The object of this arrangement is to cause the weighted stem 32 to pull the valve 25 downward during the initial discharge operation but to relieve the valve of the weight at the beginning of the filling operation so that the float may more easily close the valve.

The counter 5 may be connected to the valve 11 in any suitable manner as by a rod 33 slidable in the drive shaft 34 of the counter and pivoted to the valve as at 35 so as to reciprocate the shaft of the counter with each reciprocation of the valve.

The height of the cylinder of the metering chamber is preferably such that it does not rise substantially above the extension 9 or the attaching means of the device so that the main container may be drained of all of its contents through the metering device without requiring any tilting, it being understood that the device will be attached to the container immediately above the floor of the latter.

The operation of the valve 11 is subject to the coin-control 4. When the handle 11' is in the upright position shown in Figures 1 and 3, the valve is in filling position, as shown in the latter figure. When the handle is pulled down to substantially horizontal position the valve 11 is in discharging position. These two positions may be considered the end positions of the valve and of the valve handle. A spring 36 acting on the valve tends to turn it back into filling position which is the normal position for the valve.

The coin control is mounted adjacent the horizontal section of the conduit, between the metering chamber and the vertical part of the conduit, and it comprises a flanged disc 37 which may be permanently fastened to the underface of the conduit, a coin receiving box 38 threaded into the flange of the disc and a coin-controlled locking mechanism interposed between the chute 40 and the receiving box 38. A lock 38' retains the box 38 in place.

The latter mechanism is housed in a flat, horizontal housing 41 disposed on a level with the horizontal portion of the conduit 6 and with a projecting portion of the housing 42 for the valve 11, the housing 41 being provided with a horizontal guideway 43 leading through the valve housing to the periphery of the valve 11, which at this point, has an enlarged cylindrical section 44, (see Figure 2).

The guideway may accommodate a detent 45 and a control member 46 for the detent, which are shown separately in perspective view in Figure 4 and which are slidably mounted in adjacent relation, with their front ends normally riding on the surface of the valve 11. A spring 47 urges the detent 45 toward the valve and a spring 48 urges the control member 46 in the same direction.

The detent and control member are preferably interlocked by a tongue 49 of the control member 46 riding in a short channel 50 formed on the front face of the detent 45 by a flange 50' at the rear end of the detent, and by the front end 51 of the control member 46 riding along the rear face of the detent 45, which latter is formed with an off-set 52 for this purpose. The control member 46 has a hooked nose 53 while the detent 45 has a concave nose 54 fitting substantially the periphery of the valve and having a slanting base 55.

The control member 46 is provided with a short projection 56 having a slanting rear face and this projection cooperates with the flange 50' in forming a seat for the coin 57, as shown in Figure 5, while the tongue 49 operates, in another position, as a stop for a second coin, as shown in Figure 6.

The valve 11 is formed, in its enlarged section 44, with a depression 58 in the vertical plane of the control member 46 and with a second depression 59 in the plane of the detent 45, the latter depression having a deep section 60 corresponding in length substantially to the depth of the front end of the detent 45 and a shallow section 61 communicating therewith.

For explaining the operation of the coin control, reference is had principally to Figures 1, 5 and 6. Figure 1 shows the valve in its normal position, in which liquid is free to enter from the container into the metering chamber. It will be noted that both the detent and control member bear on the full cylindrical surface of the valve and occupy a retracted position. If now an operator should attempt to withdraw the liquid from the metering chamber without the insertion of a coin and should initiate a downward pull on the handle, the detent 45 would be brought opposite the depression 59 and would be plunged into the deep portion 60 of the depression, thereby locking the valve against further rotary motion.

If, however, a coin is inserted prior to the operation of the handle, the coin will drop through the chute and will come to rest on its seat between the coacting member 56 of the control member 46 and the flange 50' of the detent 45. The control member 46 is held in retracted position because it rides on the full peripheral surface of the valve and the detent 45 is now held in retracted position by the coin, as shown in Figure 5. The operator is now free to operate the handle and to draw the liquid from the metering chamber.

As the handle approaches its extreme position on the downward pull, the depression 58 in the valve is brought opposite the nose of the control member 46 and the latter is now permitted to move forward under the influence of its spring. This releases the coin, which now drops into the coin compartment 38. The dropping of the coin releases the detent 45 which now plunges forward into the shallow portion 61 of the depression 59 and bearing against the extreme end thereof and stops further movement. This is the discharge position shown in Figure 6.

The forward movement of the control member 46 brings the top edge of the tongue 49 into the chute, as shown in Figure 6 and prevents further coins which may have been inserted, from dropping upon the coin seat.

The operator now permits the contents of the metering chamber to drain into his glass or other receptacle held under the spout 7 and then returns the handle to its original position. During this reverse movement of the valve the detent and control member are brought back to their original positions, the hooked nose 53 of the control member 46 being forced backward by the peculiar shape of the depression 58 and the detent 45 being forced backward by the slanting base 55 striking a similarly inclined face in the depression 59. The device is now set for the next operation.

When the handle is in its initial position as shown in Figure 1, the valve 11 is positioned to permit liquid to flow from the container into the metering chamber, as shown in Figure 3. The weighted member 32 is lifted by the shape of the valve port 12. As the liquid rises in the metering chamber and reaches a predetermined height, the float 27 rises and closes the vent 25 which stops the flow of the liquid beyond a predetermined height.

When the handle is moved for discharging from the metering chamber, the curved shape of the port 12 permits the weighted member 32 to drop which automatically and positively opens the vent valve 25 during the initial discharge operation.

In Figure 7 I show a modification of the venting means which I employ for the metering chamber, and the details thereof will now be set forth. Although I have shown the liquid dispensing device 1' fragmentarily, it will be appreciated that the faucet 2' is adapted for connection to the liquid container 10' in exactly the same manner as in the first form.

In the modification the valve 11a is adapted for connecting the metering chamber 3' with the conduit 6a leading from the liquid container 10' when in one position and for discharging the contents from the metering chamber when in another position. The operation of the valve 11a is the same as that in the preferred form previously described. The valve 11a is coin-controlled by the same mechanism as that illustrated in connection with Figures 1 to 6, inclusive. This coin-controlled mechanism has been omitted from Figure 7.

Figure 7 further discloses the bottom plate 14' and the top plate 15' of the metering chamber as being drawn upon the opposite ends of the glass cylinder 16' by means of a threaded tube 17', the latter being perforated. The top plate has a vent 24' therein, which may be closed by means of a valve 25', the latter having a spring 75 urging the vent valve into vent-closing position.

It will be noted that an eccentric 76 is fastened to the faucet valve 11a so as to be operated thereby, and a collar 77 surrounds the eccentric. A rod 78 is fixed to the collar 77 at one end thereof, while the upper end of the rod is turned to present a horizontal section 79. The latter is connected to the vent valve by a ball and socket connection 80. When the faucet valve 11a is in chamber-filling position the vent valve 25' is closed by the eccentric 76 and the rod 78, the spring 75 also urging the valve 25' into closed position.

Upon turning the faucet valve 11a for discharging the contents from the metering chamber 3' through the spout 7', the eccentric acts to open the vent valve 25' and thus permit air to enter the metering chamber.

In this connection it will be noted that when a liquid flows by gravity from the container 10' into the metering chamber 3' (the valve 25' being closed), air will be compressed in the space 81 at the top of the metering chamber. The same type of liquid will always rise to the same level, provided that no air is permitted to escape from the metering chamber.

I claim:

1. A coin control for a rotary valve mounted in a horizontal conduit comprising a base plate projecting from the conduit rearwardly of and in proximate relation to the valve, a coin box suspended from the base plate, a vertical slot member rising from the base plate above and in line with the coin box and having a horizontal passage leading to the rotary valve, a pair of coacting bars slidable in the horizontal passage, cooperating means on the front ends of the bars and the valve for effecting locking and releasing operations and means on the rear ends of the bars subject to control of a coin passing from the coin slot member to the coin box for controlling said operations.

2. A coin control for a rotary valve mounted in a horizontal conduit, comprising a horizontal passage leading to said valve, a vertical coin passage intersecting the rear end of the former passage, a pair of coacting bars slidable in the horizontal passage, cooperating means on the front ends of the bars and the valve for effecting locking and releasing operations and means on the rear ends of the bars subject to control of a coin passing through the vertical passage for controlling said operations.

3. A coin control for a rotary valve mounted in a horizontal conduit, comprising a horizontal passage leading to said valve, a vertical coin passage intersecting the rear end of the former passage, rigid means slidable in the horizontal passage and having front and rear ends, cooperating means at the front of said means and the valve for effecting locking and releasing operations, and means on the rear of said rigid means subject to control of a coin passing through the vertical passage for controlling said operations.

PETER SLOBODY.